US008659262B2

(12) United States Patent
Goto et al.

(10) Patent No.: US 8,659,262 B2
(45) Date of Patent: Feb. 25, 2014

(54) BATTERY CHARGERS THAT ARE USED FOR POWER TOOLS AND ARE CONFIGURED TO BE CONNECTIBLE WITH CELLULAR PHONES

(75) Inventors: Masahiko Goto, Anjo (JP); Tsuyoshi Murayama, Anjo (JP)

(73) Assignee: Makita Corporation, Anjo-Shi (JP)

( * ) Notice: Subject to any disclaimer, the term of this patent is extended or adjusted under 35 U.S.C. 154(b) by 506 days.

(21) Appl. No.: 12/916,688

(22) Filed: Nov. 1, 2010

(65) Prior Publication Data

US 2011/0101912 A1    May 5, 2011

(30) Foreign Application Priority Data

Nov. 2, 2009  (JP) ................................. 2009-251819

(51) Int. Cl.
*H02J 7/00* (2006.01)
(52) U.S. Cl.
USPC ............................ 320/107; 320/113; 320/115
(58) Field of Classification Search
USPC ........................................................ 320/107
See application file for complete search history.

(56) References Cited

U.S. PATENT DOCUMENTS

| 5,525,888 | A | * | 6/1996 | Toya | 320/111 |
| 5,903,135 | A | * | 5/1999 | Posses et al. | 320/114 |
| 6,043,626 | A | * | 3/2000 | Snyder et al. | 320/113 |
| 6,075,341 | A | * | 6/2000 | White et al. | 320/114 |
| 2001/0053692 | A1 | * | 12/2001 | Ito et al. | 455/425 |

FOREIGN PATENT DOCUMENTS

| JP | A-10-307961 | 11/1998 |
| JP | U-3065846 | 11/1999 |
| JP | A-2000-286929 | 10/2000 |
| JP | A-2003-319032 | 11/2003 |
| JP | A 2008-086065 | 4/2008 |
| WO | WO 01/97492 A1 | 12/2001 |

OTHER PUBLICATIONS

Dec. 18, 2012 Office Action issued in Japanese Application No. 2009-251819 (with translation).
Aug. 6, 2013 Japanese Office Action issued in Japanese Patent Application No. 2009-251819 (With translation).

* cited by examiner

*Primary Examiner* — Arun Williams
(74) *Attorney, Agent, or Firm* — Oliff PLC

(57) ABSTRACT

A battery charger includes telephone handset and a connector for connecting with a cellular phone. A sound signal can be transmitted between the telephone handset and the cellular phone via the connector.

9 Claims, 3 Drawing Sheets

BATTERY CHARGERS THAT ARE USED FOR POWER TOOLS AND ARE CONFIGURED TO BE CONNECTIBLE WITH CELLULAR PHONES

This application claims priority to Japanese patent application serial number 2009-251819, the contents of which are incorporated herein by reference.

BACKGROUND OF THE INVENTION

1. Field of the Invention

The present invention relates to battery chargers, and in particular to battery chargers that are used for power tools and are configured to be connectible with cellular phones.

2. Description of the Related Art

Japanese Laid-Open Patent Publication No. 2008-86065 teaches a battery charger used for a power tool. The battery charger of this publication has a connector, to which a cellular phone can be connected, so that information regarding the charging condition can be transmitted from the battery charger to the cellular phone via the connector. Therefore, it is possible, for example, to transmit information, such as information regarding completion of the charging operation, from the cellular phone connected to the battery charger to a different cellular phone carried by an operator who works at a place remote from the battery charger.

According to the battery charger of the above publication, the cellular phone is used only as means for transmitting information. There is provided no other function for improving the usability of the cellular phone.

For example, workers working at different locations in the same construction may frequently talk each other about the proceeding of construction by using their cellular phones. In some cases, one or both of workers who are talking to each other may wish to make a note of a point of discussion while he or she holds a design drawing. However, it may be difficult to make a note and hold a design drawing while he or she holds the cellular phone with one hand.

Therefore, there is a need in the art for a battery charger that is configured to be connectible with a cellular phone and is improved in usability.

SUMMARY OF THE INVENTION

A battery charger includes telephone set and a connector for connecting with a cellular phone. A sound signal can be transmitted between the telephone set and the cellular phone via the connector.

DETAILED DESCRIPTION OF THE INVENTION

Figure 1:
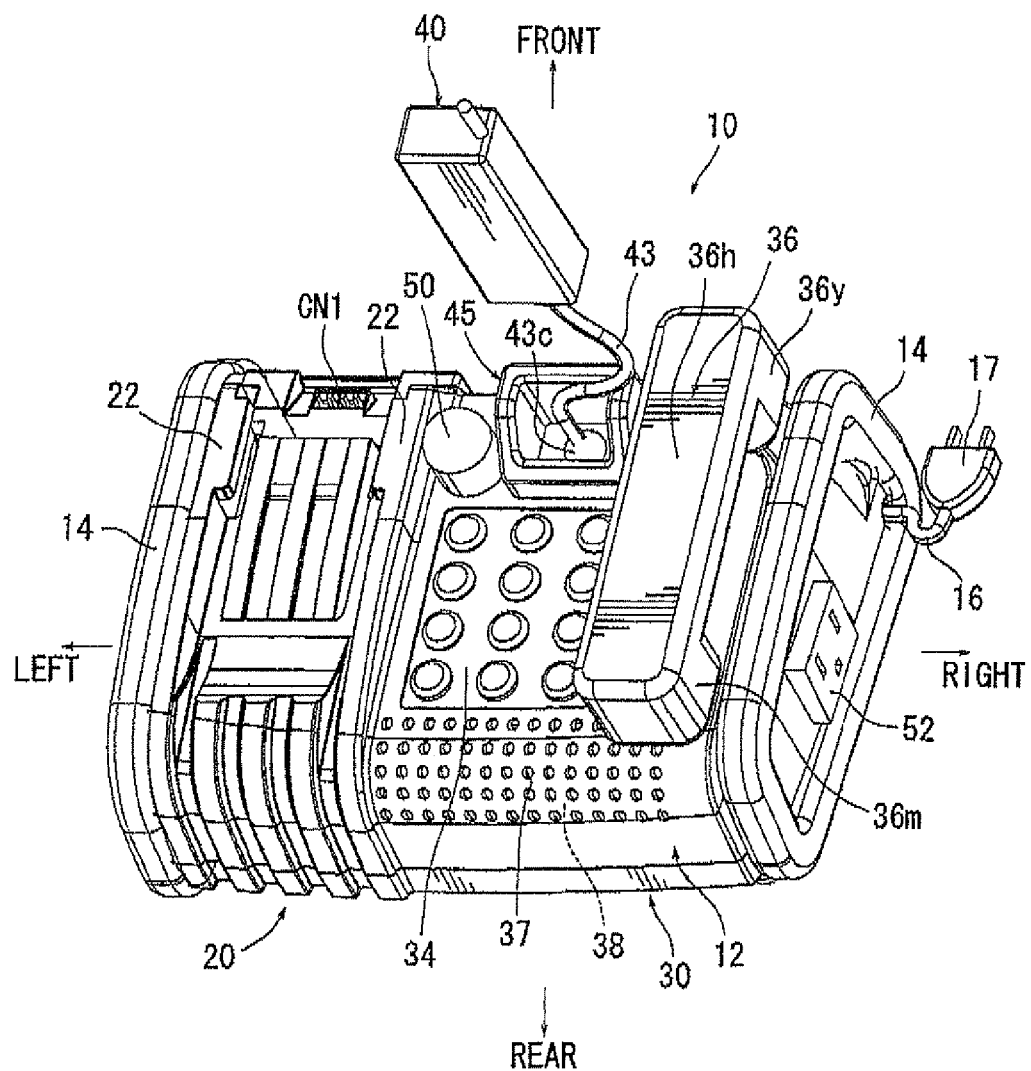
FIG. 1 is a perspective view of a battery charger according to an example.

Each of the additional features and teachings disclosed above and below may be utilized separately or in conjunction with other features and teachings to provide improved battery chargers. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In one example, a battery charger includes a charger section capable of charging a battery of a power tool, and a connector connectible with a cellular phone. The battery charger further includes a speaker section and a microphone section. The speaker section converts a sound signal received from the cellular phone via the connector into a sound. The microphone section converts a sound into a sound signal that can be transmitted to the cellular phone. A holder can be held by a user and supports the speaker section and the microphone section, so that the user can use the speaker section and the microphone section for making a call through use of a telecommunication function of the cellular phone.

Therefore, for making a call through use of the telecommunication function of the cellular phone, the user can use the speaker section and the microphone section by holding the holder. For example, the user can hold the holder without use of his or her hand, for example by holding the holder between a cheek and a shoulder. In other words, the user can make a call with his or her hands free.

Hence, a discussion regarding the proceeding of a work, etc., using the cellular phone can be efficiently made even in the case that both hands of the user are not free. As a result, the usability of the cellular phone can be improved.

The battery charger may further include a housing and a fixed phone section assembled with the housing. The charger section also may be assembled with the housing. The fixed phone section may enable a call through use of the telecommunication function of the cellular phone. The fixed phone section may include a telephone handset that has the holder, the first speaker section and the microphones section.

For example, the fixed phone section may include an operation panel that can be used for making a call through the cellular phone.

The battery charger may further include a revolving light capable of revolving and emitting light according to a charging condition of the battery or when the cellular phone receives a call. Therefore, the user can recognize the charging condition of the battery or the receipt of a call at the cellular phone even in a loud environment.

The battery charger may further include a power supply section capable of supplying a power of the battery of the power tool to the cellular phone. Therefore, it is possible to charge the battery of the cellular phone at a work site, so that the usability of the cellular phone can be further improved.

The battery charger may further include a speaker capable of converting a sound signal transmitted from the cellular phone into a sound. The speaker is disposed within the housing. Therefore, the speaker can be used for listening music or the like downloaded into the cellular phone at a work site.

An electrical outlet may be mounted to the housing and capable of supplying an AC power. Therefore, a power tool, a light or any other device that requires an AC power can be used by connecting to the electrical outlet. The electrical outlet may be an interlock service outlet. In such a case, a light connected to the interlock service outlet may be lit in conjunction with the receipt of a call at the cellular phone.

The housing may have opposite end portions covered by elastic members, respectively. Therefore an impact applied to the housing can be absorbed to some extent by the elastic members, so that it is possible to prevent potential damage to the battery charger.

Figure 2:
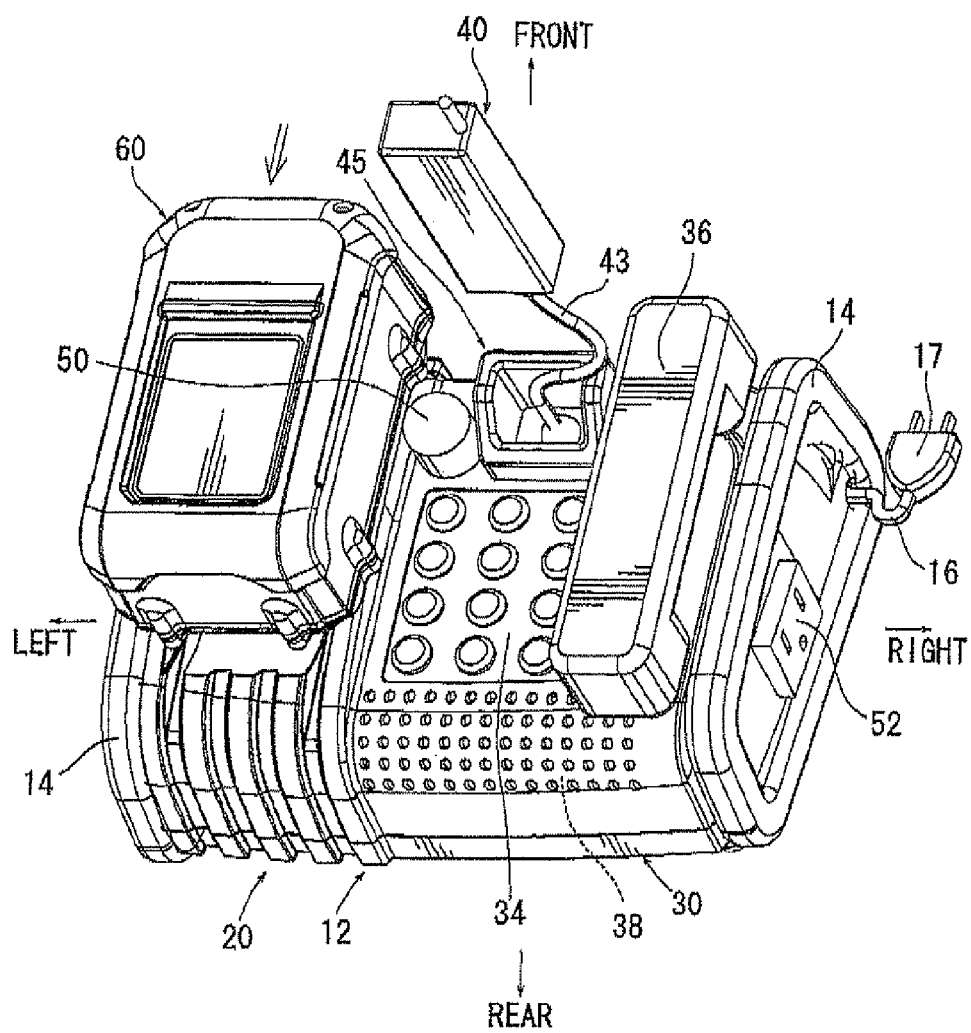
FIG. 2 is a perspective view similar to FIG. 1 but showing the state where a battery is connected to the battery charger.

A representative example will now be described with reference to FIGS. 1 to 3. Referring to FIG. 1, a representative battery charger 1 includes an integral housing 12. The housing 12 has a thin box shape and has a rectangular configuration in a plan view. A charger section 20, a fixed phone section 30 and a holder section 45 are assembled with the housing 12. The holder section 45 is configured to be capable of holding a cellular phone 40. The charger section 20 is disposed at a substantially left-side half of the housing 12, and the fixed phone section 30 is disposed at a substantially right-side half of the housing 12. The holder section 45 is disposed at a central position of the front end portion of the fixed phone section 30.

A revolving light 50 is mounted to the housing 12 at a position adjacent the left side of the holder section 45. A service outlet 52 is mounted to the right side surface of the housing 12. Two ship-like elastic members 14 are attached to the housing 12. One of the elastic members covers an entire circumferential edge of the right side surface of the housing 12 (i.e., the right side corner portion of the housing 12). The other of the elastic members 14 covers an entire circumferential edge of the left side surface of the housing 12 (i.e., the left side corner portion of the housing 12).

The charger section 20 can be used for charging a battery 60 (see FIG. 2) of a power tool (not shown). As shown in FIG. 1, the charger section 20 includes a connecting portion 22 including a pair of right and left rails extending in forward and rearward directions along the upper surface of the housing 12. The connecting portion 22 is configured to be able to comma a corresponding connecting portion (not shown) of the battery 60 and also includes positive and negative charge terminals P and N (see FIG. 3) positioned at the front end of the connecting portion 22. The charge terminals P and N can be electrically connected with corresponding positive and negative battery terminals (not shown) of the battery 60 when the connecting portion of the battery 60 is connected to the connecting portion 22 of the charger section 20 by being moved horizontally relative thereto. A signal connector CN1 is disposed between the pair of rails of the connecting portion 22 at a front end of the upper surface of the housing 12 and is connectible to a corresponding signal connector (not shown) of the battery 60.

Figure 3:
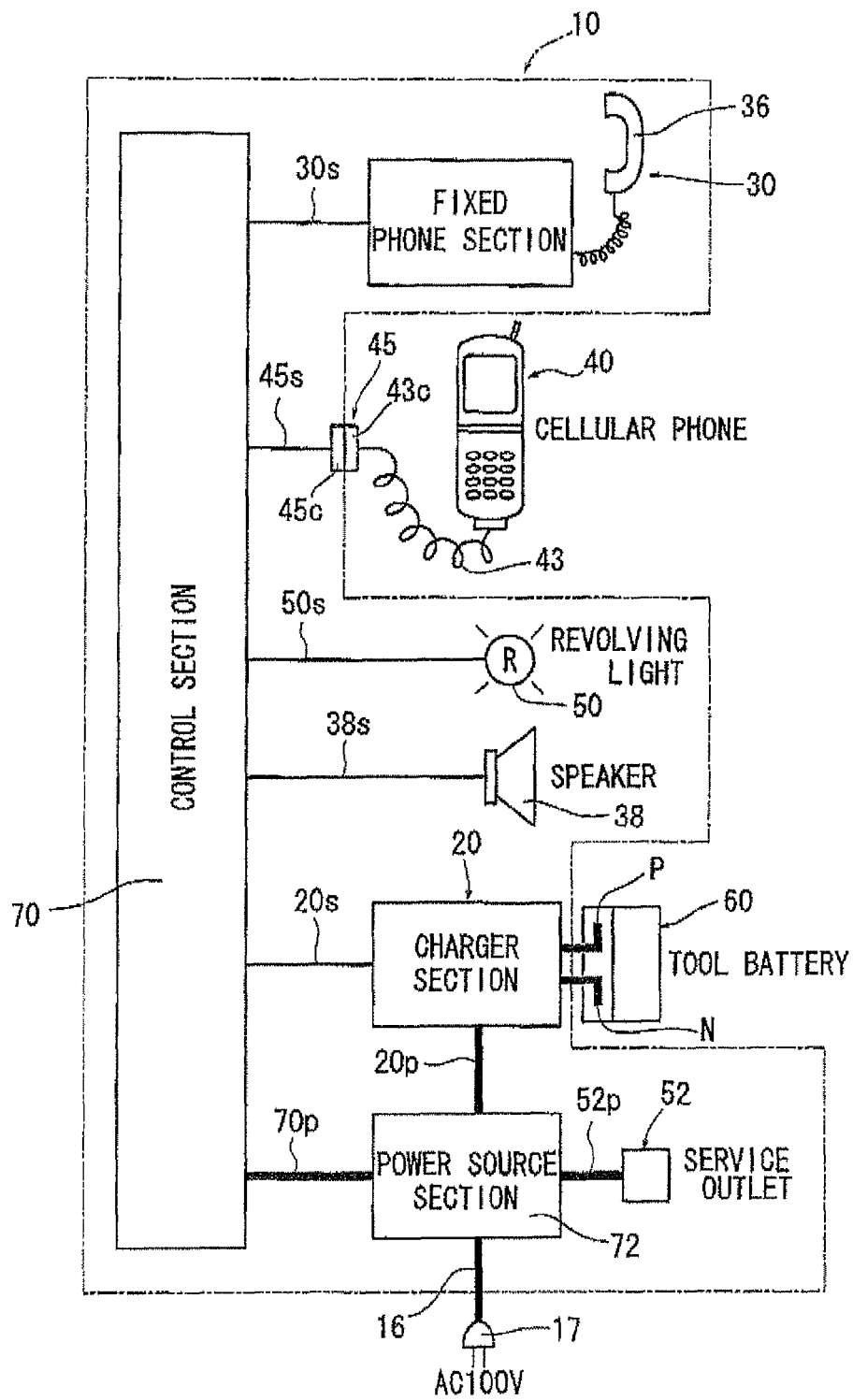
FIG. 3 is a block diagram showing a schematic circuit configuration of the battery charger.

As shown in a block diagram of FIG. 3, the charger section 20 is electrically connected to a control section 70 via a signal line 20s, so that the charger section 20 can transmit signals, such as a charge complete signal indicating completion of a charging operation and an abnormal charge signal indicating occurrence of an unusual situation during the charging operation. The charger section 20 can receive a supply of DC power from a power source section 72 that will be explained later.

The charger section 20 may include a microcomputer having a memory storing programs for performing various controls relating a charging operation. Similarly, the control section 70 may include a microcomputer having a memory storing programs for performing various controls that will be explained later.

As shown in FIG. 1, the holder section 45 is configured like a container having an open top for receiving substantially a lower half of the cellular phone 40. A connector 45c (see FIG. 3) is disposed at a bottom within inside of the holder section 45 and is connectible with a corresponding connector 43c of a cable 43 that is connected to the cellular phone 40. The connector 45c is connected to the control section 70 via a signal cable 45s. Thus, the cellular phone 40 can be connected to the control section 70 by connecting the connector 54c of the cable 43 to the connector 45c of the holder section 45.

The fixed phone section 30 serves as an adjunctive device for the operation of the cellular phone 40. As shown in FIG. 3, the fixed phone section 30 is connected to the control section 70 via a signal line 30s and is configured to be capable of transmitting and receiving data to and from the cellular phone 40 under the control of the control section 70. Thus, a user can use the fixed phone section 30 for making a call through use of a telecommunication function, more specifically, a wireless telecommunication function, of the cellular phone 40.

As shown in FIG. 1, the fixed phone section 30 has an operation panel 34 having a similar function as an operation panel (not shown) of the cellular phone 40. The operation panel 34 is positioned substantially centrally of the upper surface of the housing 12. A telephone handset 36 is placed on the right side of the operation panel 34 and includes a grip portion 36h, a speaker portion 36y positioned on the upper side of the grip portion 36h as viewed in FIG. 1, and a microphone portion 36m positioned on the lower side of the grip portion 36h. A speaker (not shown) is disposed within the speaker portion 36y. A microphone (not shown) is disposed within the microphone portion 36m. Therefore, a sound signal received by the cellular phone 40 can be transmitted to the fixed phone section 30 and can then be converted into a sound by the speaker of the speaker portion 36y under the control of the control section 70. In addition, a sound can be converted into a sound signal by the microphone of the microphone portion 36m and can then be transmitted to the cellular phone 40, from which the sound signal can be transmitted further to an intended party having a different cellular phone. Therefore, a user can talk to the intended party having the cellular phone by using the telephone handset 36. More specifically, the user may use the telephone handset 36 by gripping the grip portion 36h, applying the speaker portion 36y to his or her ear, and positioning his or her mouth near the microphone portion 36m. Alternatively, the user can hold the grip portion 36h between his or her cheek and shoulder while the speaker portion 36y being applied to the ear.

In this example, a plurality of sound holes 37 are formed in the fixed phone section 30 at positions on the rear side of the operation panel 34. A speaker 38 is disposed inside of the fixed phone section 30 and is opposed to the sound holes 37. As shown in FIG. 3, the speaker 38 is connected to the control section 70 via a signal line 38s. Therefore, a sound signal received by the cellular phone 40 or a sound signal of music or the like downloaded into the cellular phone 40 can be converted into a sound by the speaker 38 under the control of the control section 70.

The revolving light 50 positioned on the left side of the holder section 45 is connected to the control section 70 via a signal line 50s and can be lit under the control of the control section 70 when a call is received, when a charge operation has been completed, or when an unusual state occurs in the charging operation. It is also possible to play music or sound an alarm at the same time that the revolving light 50 is lit.

Referring to FIG. 3, the power source section 72 for supplying the electric power to the control section 70, the charger body 20 and the service outlet 52 is disposed within the housing 12. The power supply section 72 includes a power cable 16 having a plug 17 at one end. The plug 17 can be connected to an electrical outlet (not shown) of a commercially available power source, such as an AC 100V power source, provided at a work site, so that the power source section 72 can receive a supply of AC power. As shown in FIG. 1, the power cable 16 extends outward from the right side surface of the housing 12.

The power source section 72 is connected to the service outlet 52 via a power line 52p, so that the power source section 72 can supply an AC power to the service outlet 52. The power source section 72 has a converter for converting an AC power into a DC power that is supplied to the control section 70 via a power line 70p and is also supplied to the charger section 20 via a power line 20p.

In order to use the battery charger 10, a user may connect the plug 17 of the power cable 16 to an electrical outlet provided at a work site and may also connect the connector 43 of the cable 43 of the cellular phone 40 to the connector 45c of the holder 45. In this state, the battery 60 of the power tool is mechanically and electrically connected to the charger section 20 as shown in FIG. 3, so that a charging operation of the battery 60 can be performed. When the charging operation of the battery 60 has been completed after a period of time, the revolving light 50 rotates and emits light. At the same time, music or any other kind of sound is outputted from the speaker 38, so that the user can recognize when the battery 60 has been completely charged. It is also possible to output a signal from the cellular phone 40 to another cellular phone having a designated telephone number, so that the completion of the charging operation can be informed to another worker who works at a place remote from the work site of the user.

In addition, when the cellular phone 40 receives a call, the revolving light 50 rotates and emits light, and music or the like is outputted from the speaker 38, so that the user can recognize the receipt of the call. If the user wishes, he or she can lift the handset 36 of the fixed phone section 30 for talking to a person who called to the user. In addition, if the user wises to make a note and make reference to a design drawing or the like during the calling, he or she can hold the handset 36, for example, by holding the grip portion 36y between his or her cheep and shoulder, so that the user can talk to the called person.

Further, the user can make a call by using the operation panel 34 of the fixed phone section 30.

Furthermore, it may be also possible to charge a battery of the cellular phone 30 by using the control section 70 of the battery charger 10. Thus, if no available outlet exists around the work site, it may be possible to supply power from the control section 70 to the battery of the cellular phone 40 because the control section 70 receives the supply of power from the battery 60. It may be also possible to use the battery 60 as a power source for some of electric devices provided at the battery charger 10, such as a motor for rotating the revolving light 50.

According to the battery charger 10 described above, the user can use the telecommunication function of the cellular phone 40 connected to the battery charger 10 for calling an intended party while the user holds the handset 36 of the fixed phone 30, which include the speaker portion 36y and the microphone portion 36m. For example, the user can make a call with his or her hands free.

Therefore, in the case that the user intends to make a note of a point of discussion during calling through the cellular phone 40 while he or she holds a design drawing, it is possible to efficiently perform the discussion. Therefore, the usability of the cellular phone 40 can be improved.

In addition, the user can operate the operation panel 34 of the fixed phone section 30 provided at the housing 12 of the battery charger 10 for making a call through the cellular phone 40.

Further, because the revolving light 50 is provided on the housing 12 for informing the user of the charging condition of the battery 60 or informing the receipt of a call by the cellular phone 40, it is possible to recognize the charging condition of the battery 60 or the receipt of a call through the cellular phone 40 even in the case that the user works in a loud environment.

Furthermore, the control section 70 enables a power from a commercially available power source or a power from the battery 60 to be used for charging the battery of the cellular phone 40. Therefore, the battery of the cellular phone 40 can be charged at a work site where the battery charger 10 is used. As a result, the usability of the cellular phone 40 can be further improved.

Furthermore, the sound signal received by the cellular phone 40 can be converted into a sound by the speaker 38 that is disposed within the housing 12. Therefore, music or the like downloaded into the cellular phone 40 can be listened at a work site.

Furthermore, the service outlet 52 for the supply of a power from a commercially available power source is mounted to the housing 12. Therefore, it is possible to use the service outlet 52 for supplying a power to a power tool, a light or any other device that requires an AC power.

Furthermore, because the entire circumferential edge of each of the right and left side surfaces of the housing 12 is covered by the strip-like elastic member 14 from the outside, a potential impact that may be applied to the housing 12 from the outside can be absorbed. Therefore, it is possible to prevent the housing 12 from being damaged.

Although the fixed phone section 30 of the above embodiment has the handset 36, the handset 36 may be replaced with another telephone set, such as a headphone or a set of an earphone and a microphone. Further, although the fixed phone section 30 has the operation panel 34, the operation panel 34 may be omitted in some cases.

What is claimed is:

1. A battery charger comprising:
a charger section capable of charging a battery of a power tool;
a connector connectible with a cellular phone;
a speaker section converting a sound signal received from the cellular phone via the connector into a sound;
a microphone section converting a sound into a sound signal that can be transmitted to the cellular phone;
a holder capable of being held by a user and supporting the speaker section and the microphone section, so that the user can use the speaker section and the microphone section for making a call through use of a telecommunication function of the cellular phone;
a housing having the charger section assembled therewith; and
a fixed phone section assembled with the housing and configured to enable a call through use of the telecommunication function of the cellular phone;
wherein the fixed phone section includes a telephone handset; and
wherein the telephone handset comprises the holder, the first speaker section and the microphones section.

2. The battery charger as in claim 1, further comprising a revolving light capable of revolving and emitting light according to a charging condition of the battery.

3. The battery charger as in claim 1, further comprising a revolving light capable of revolving and emitting light when the cellular phone receives a call.

4. The battery charger as in claim 1, further comprising a power supply section capable of supplying a power of the battery of the power tool to the cellular phone.

5. The battery charger as in claim 1, further comprising a power supply section capable of supplying a power from a commercially available power source to the cellular phone.

6. The battery charger as in claim 1, further comprising a speaker capable of converting a sound signal transmitted from the cellular phone into a sound, wherein the speaker is disposed within the housing.

7. The battery charger as in claim 1, further comprising an electrical outlet mounted to the housing and capable of supplying an AC power.

8. The battery charger as in claim 1, wherein the housing has opposite end portions covered by elastic members, respectively.

9. A battery charger comprising:
 a charger section for charging a battery of a power tool;
 a connector connectible with a cellular phone;
 a telephone handset;
 a control section connected between the connector and the telephone handset, so that a sound signal can be transmitted between the telephone handset and the cellular phone via the connector;
 a housing, wherein the charger section and the control section are assembled with the housing, and the connector is mounted to the housing; and
 a fixed phone section mounted to the housing, wherein the telephone handset is connected to the stationary phone section via a cable.

* * * * *